(12) United States Patent
Zhong et al.

(10) Patent No.: US 12,001,094 B2
(45) Date of Patent: Jun. 4, 2024

(54) OPTICAL FILM AND METHOD OF MANUFACTURING THE SAME, REFLECTIVE LIQUID CRYSTAL DISPLAY PANEL AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xuan Zhong, Beijing (CN); Hongliang Yuan, Beijing (CN); Qi Zheng, Beijing (CN); Yao Bi, Beijing (CN); Xiaojuan Wu, Beijing (CN); Zhiqiang Zhao, Beijing (CN); Zhangxiang Cheng, Beijing (CN); Jiaxing Wang, Beijing (CN); Donghua Zhang, Beijing (CN); Ce Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 261 days.

(21) Appl. No.: 17/605,520

(22) PCT Filed: Nov. 17, 2020

(86) PCT No.: PCT/CN2020/129427
§ 371 (c)(1),
(2) Date: Oct. 21, 2021

(87) PCT Pub. No.: WO2022/104538
PCT Pub. Date: May 27, 2022

(65) Prior Publication Data
US 2022/0382102 A1 Dec. 1, 2022

(51) Int. Cl.
*G02F 1/1335* (2006.01)
*B29D 11/00* (2006.01)
(Continued)

(52) U.S. Cl.
CPC .. *G02F 1/133531* (2021.01); *B29D 11/00644* (2013.01); *B29D 11/00894* (2013.01);
(Continued)

(58) Field of Classification Search
CPC .......... G02F 1/133531; G02F 2202/04; B29D 11/00644; B29D 11/00894; C09B 1/00; C09B 67/0063; C09K 19/603; G02B 1/08
See application file for complete search history.

(56) References Cited

U.S. PATENT DOCUMENTS

| 6,337,111 B1 | 1/2002 | Ichihashi |
| 2004/0212112 A1 | 10/2004 | Tsujimoto |

(Continued)

FOREIGN PATENT DOCUMENTS

| CN | 1569436 A | 1/2005 |
| CN | 101630032 A | 1/2010 |

(Continued)

OTHER PUBLICATIONS

Mochizuki,CN104115042A,Machine Translation Oct. 2014 (Year: 2014).*

*Primary Examiner* — Tracie Y Green
(74) *Attorney, Agent, or Firm* — IP & T GROUP LLP (57) ABSTRACT

An optical film includes a polarizer. The polarizer includes a base layer, and a material of the base layer is obtained by dyeing a base material with a dye. The base material includes a polyvinyl alcohol material, and the dye is selected from blue dichroism organic dyes.

20 Claims, 7 Drawing Sheets

(51) Int. Cl.
  *C09B 1/00*        (2006.01)
  *C09B 67/20*       (2006.01)
  *C09K 19/60*       (2006.01)
  *G02B 1/08*        (2006.01)
  *G02F 1/13363*     (2006.01)
  *G02F 1/1337*      (2006.01)
  *G02F 1/139*       (2006.01)
  *B29K 29/00*       (2006.01)
  *G02B 5/30*        (2006.01)

(52) U.S. Cl.
  CPC ............ *C09B 1/00* (2013.01); *C09B 67/0063* (2013.01); *C09K 19/603* (2013.01); *G02B 1/08* (2013.01); *G02F 1/133638* (2021.01); *G02F 1/133761* (2021.01); *G02F 1/1398* (2021.01); *B29K 2029/04* (2013.01); *G02B 5/3025* (2013.01); *G02B 5/3083* (2013.01); *G02F 2202/04* (2013.01); *G02F 2202/28* (2013.01); *G02F 2203/02* (2013.01); *G02F 2413/02* (2013.01); *G02F 2413/05* (2013.01); *G02F 2413/06* (2013.01); *G02F 2413/08* (2013.01)

(56) References Cited

U.S. PATENT DOCUMENTS

| | | | |
|---|---|---|---|
| 2006/0103791 A1* | 5/2006 | Zhu | G02F 1/1396 |
| | | | 349/113 |
| 2011/0234079 A1 | 9/2011 | Eom et al. | |
| 2013/0010236 A1 | 1/2013 | Nam et al. | |
| 2014/0126053 A1 | 5/2014 | Won et al. | |
| 2015/0301252 A1* | 10/2015 | Nam | G02B 5/3033 |
| | | | 156/229 |
| 2021/0036264 A1* | 2/2021 | Hu | H10K 59/12 |

FOREIGN PATENT DOCUMENTS

| | | |
|---|---|---|
| CN | 102208553 A | 10/2011 |
| CN | 103097927 A | 5/2013 |
| CN | 103336325 A | 10/2013 |
| CN | 103809233 A | 5/2014 |
| CN | 104115042 A | 10/2014 |
| CN | 107490818 A | 12/2017 |
| CN | 107884847 A | 4/2018 |
| JP | 2007187741 A | 7/2007 |

\* cited by examiner

OPTICAL FILM AND METHOD OF MANUFACTURING THE SAME, REFLECTIVE LIQUID CRYSTAL DISPLAY PANEL AND DISPLAY APPARATUS

CROSS-REFERENCE TO RELATED APPLICATION

This application is a national phase entry under 35 USC 371 of International Patent Application No. PCT/CN2020/129427 filed on Nov. 17, 2020, which is incorporated herein by reference in its entirety.

TECHNICAL FIELD

The present disclosure relates to the field of illumination and display technologies, and in particular, to an optical film and a method of manufacturing the same, a reflective liquid crystal display panel, and a display apparatus.

BACKGROUND

A reflective display apparatus is a new type of display apparatus, which may utilize an ambient light source as a source of illumination to display images. Therefore, compared with a transmission display apparatus, the reflective display apparatus has advantages of energy conservation and environmental protection, and is more and more widely concerned by people.

SUMMARY

In an aspect, an optical film is provided. The optical film includes a polarizer. The polarizer includes a base layer, and a material of the base layer is obtained by dyeing a base material with a dye. The base material includes a polyvinyl alcohol material, and the dye is selected from blue dichroism organic dyes.

In some embodiments, the dye is an azo dye or an anthraquinone dye.

In some embodiments, a mass percentage of the dye in the base material is 0.01% to 2%.

In some embodiments, a value of a* of the polarizer in a CIE1976 L*a*b* chromaticity space is −0.19, and a value of b* of the polarizer in a CIE1976 L*a*b* chromaticity space is −2.66.

In some embodiments, the polarizer includes a first surface and a second surface opposite to each other in a thickness direction of the polarizer. The optical film further includes a phase compensation film disposed on the first surface, and the phase compensation film include at least one of a half wave (λ/2) plate or a quarter wave (λ/4) plate.

In some embodiments, the phase compensation film includes the λ/2 plate and the λ/4 plate, an angle of an absorption axis of the polarizer is 150 degrees to 180 degrees, an angle of a slow axis of the λ/2 plate is 40 degrees to 80 degrees, and an angle of a slow axis of the λ/4 plate is −20 degrees to 20 degrees; the λ/4 plate is closer to the polarizer than the λ/2 plate. Or, the phase compensation film includes the λ/2 plate, an angle of an absorption axis of the polarizer is −30 degrees to 30 degrees, and an angle of a slow axis of the λ/2 plate is 45 degrees to 80 degrees. Or, the phase compensation film includes the λ/4 plate, an angle of an absorption axis of the polarizer is 150 degrees to 180 degrees, and an angle of a slow axis of the λ/4 plate is 15 degrees to 135 degrees.

In some embodiments, the optical film further includes a protective film disposed on the second surface.

In some embodiments, the optical film further includes an adhesive layer disposed on a side of the phase compensation film away from the polarizer.

In some embodiments, the optical film further includes a release film disposed on a side of the adhesive layer away from the polarizer.

In another aspect, a reflective liquid crystal display panel is provided. The reflective liquid crystal display panel includes a liquid crystal cell and the optical film as described above.

In some embodiments, the liquid crystal cell includes a display substrate and an opposite substrate disposed opposite to each other. The optical film is disposed on a side of the opposite substrate away from the display substrate. The optical film includes a phase compensation film, and the phase compensation film is closer to the opposite substrate than the polarizer.

In some embodiments, a* of a white picture displayed by the reflective liquid crystal display panel in a CIE1976 L*a*b* chromaticity space is less than or equal to −0.769, and b* of the white picture displayed by the reflective liquid crystal display panel in the CIE1976 L*a*b* chromaticity space is less than or equal to 2.932.

In some embodiments, the liquid crystal cell further includes: a first alignment film disposed on the display substrate and a second alignment film disposed on the opposite substrate, and a liquid crystal layer disposed between the display substrate and the opposite substrate. The first alignment film has a first alignment angle with respect to a reference line, and the second alignment film has a second alignment angle with respect to the reference line. The first alignment angle is 100 degrees to 150 degrees, and the second alignment angle is 30 degrees to 80 degrees. A retardation amount of the liquid crystal cell is 150 nm to 300 nm.

In some embodiments, a twist angle of liquid crystal molecules in the liquid crystal layer is 50 degrees to 90 degrees.

In another aspect, a display apparatus is provided. The display apparatus includes the reflective liquid crystal display panel as described above.

In yet another aspect, a method of manufacturing an optical film is provided. The optical film is applied to a reflective liquid crystal display panel including a liquid crystal cell, and includes a phase compensation film and a polarizer. The manufacturing method includes:

obtaining values of a* and b* of the polarizer in a CIE1976 L*a*b* chromaticity space, according to target values of a* and b* of a white picture displayed by the reflective liquid crystal display panel in the CIE1976 L*a*b* chromaticity space and reference values of a combination of the reflective liquid crystal display panel including the phase compensation film and the liquid crystal cell except for the polarizer in the CIE1976 L*a*b* chromaticity space; and dyeing a base material with a dye corresponding to the values of a* and b* of the polarizer to be formed in the CIE1976 L*a*b* chromaticity space to form the polarizer.

In some embodiments, before obtaining the values of a* and b* of the polarizer in the CIE1976 L*a*b* chromaticity space, according to the target values of a* and b* of the white picture displayed by the reflective liquid crystal display panel in the CIE1976 L*a*b* chromaticity space and the reference values of the combination in the CIE1976 L*a*b* chromaticity space, the method further includes:

obtaining the reference values of a* and b* of the combination in the CIE1976 L*a*b* chromaticity space, according to optical parameters of the reflective liquid crystal display panel; the optical parameters of the reflective liquid crystal display panel including: an angle of an absorption axis of the polarizer, an angle of a slow axis and a retardation amount of the phase compensation film, a retardation amount of the liquid crystal cell, and a twist angle of liquid crystal molecules in the liquid crystal layer.

In some embodiments, obtaining the reference values of a* and b* of the combination in the CIE1976 L*a*b* chromaticity space, according to the optical parameters of the reflective liquid crystal display panel, includes:

obtaining simulation color coordinate values of the white picture displayed by the reflective liquid crystal display panel through simulation calculation, according to the optical parameters of the reflective liquid crystal display panel; and calculating simulation values of a* and b* of the reflective liquid crystal display panel in the CIE1976 L*a*b* chromaticity space, according to the simulation color coordinate values and a corresponding relationship between color coordinates of the white picture displayed by the reflective liquid crystal display panel in the CIE1976 L*a*b* chromaticity space and a* and b* of the white picture displayed by the reflective liquid crystal display panel in the CIE1976 L*a*b* chromaticity space; the simulation values of a* and b* of the reflective liquid crystal display panel in the CIE1976 L*a*b* chromaticity space being the reference values; or obtaining actual values of the reflective liquid crystal display panel in the CIE1976 L*a*b* chromaticity space, according to a deviation between the obtained simulation values of a* and b* of the reflective liquid crystal display panel in the CIE1976 L*a*b* chromaticity space by calculation and the actual values of the reflective liquid crystal display panel in the CIE1976 L*a*b* chromaticity space; the actual values of a* and b* of the reflective liquid crystal display panel in the CIE1976 L*a*b* chromaticity space being the reference values.

In some embodiments, before obtaining the values of a* and b* of the polarizer in the CIE1976 L*a*b* chromaticity space, according to the target values of a* and b* of the white picture displayed by the reflective liquid crystal display panel in the CIE1976 L*a*b* chromaticity space and the reference values of the combination in the CIE1976 L*a*b* chromaticity space, the method further includes:

obtaining the target values of a* and b* of the white picture displayed by the reflective liquid crystal display panel in the CIE1976 L*a*b* chromaticity space, according to target values of color coordinates of the white picture displayed by the reflective liquid crystal display panel.

In some embodiments, the dye is an azo dye or an anthraquinone dye, and a mass percentage of the dye in the base material is 0.01% to 2%.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description can be regarded as schematic diagrams, but are not limitations on actual sizes of products, actual processes of methods and actual timings of signals to which the embodiments of the present disclosure relate.

DETAILED DESCRIPTION

Technical solutions in some embodiments of the present disclosure will be described clearly and completely below with reference to the accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Below, the terms "first" and "second" are only used for descriptive purposes, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" means an open and inclusive expression, which does not exclude apparatuses that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

Terms such as "about" or "approximately" as used herein includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to cross-sectional views and/or plan views as idealized exemplary drawings. In the accompanying drawings, thickness of layers and regions are enlarged for clarity. Therefore, variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown in a rectangular shape generally has a curved feature. Therefore, the regions shown in the accompanying drawings are schematic in nature, and their shapes are not intended to show actual shapes of the region in a device, and are not intended to limit the scope of the exemplary embodiments.

Some embodiments of the present disclosure provide a display apparatus. The display apparatus includes a reflective liquid crystal display (RLCD) panel and a front light source. The display apparatus may include any product or component having a display function such as an electronic paper, a mobile phone, a tablet computer, a television, a display, a notebook computer, a digital photo frame or a navigator.

Figure 1:
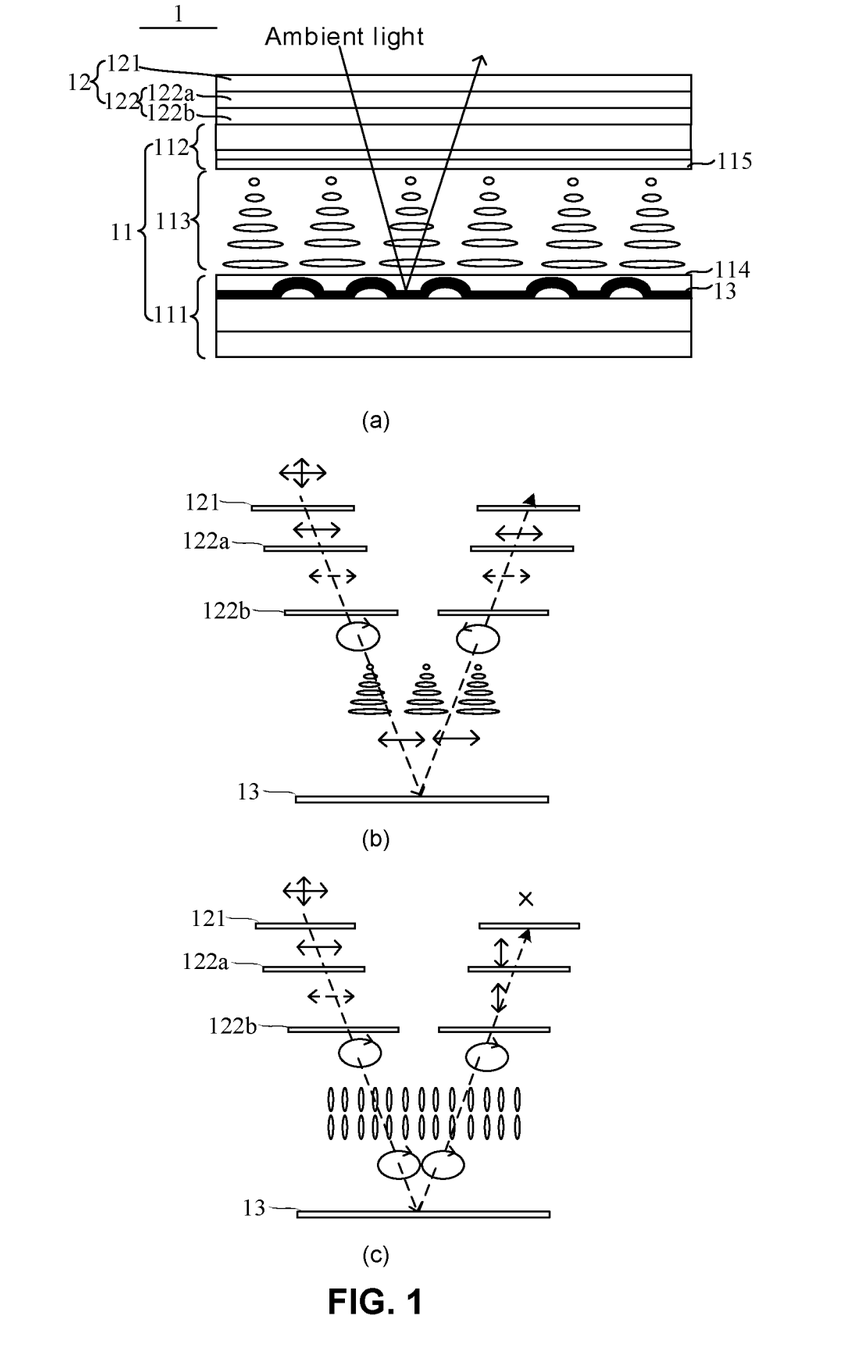
FIG. 1 is a diagram illustrating a sectional structure and a principle of a display implementation manner of a reflective liquid crystal display panel, in accordance with some embodiments.
Figure 2:
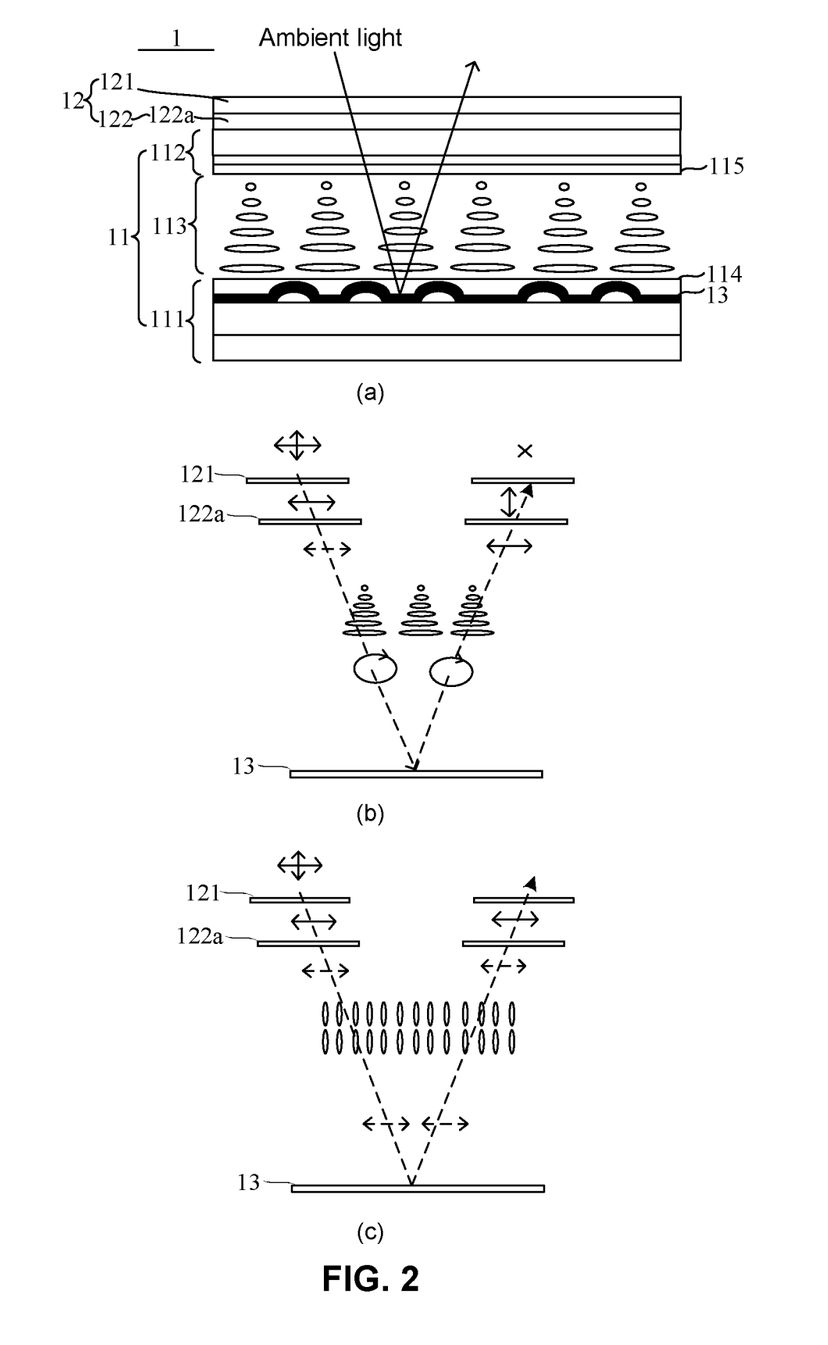
FIG. 2 is a diagram illustrating a sectional structure and a principle of a display implementation manner of a reflective liquid crystal display panel, in accordance with some other embodiments.
Figure 3:
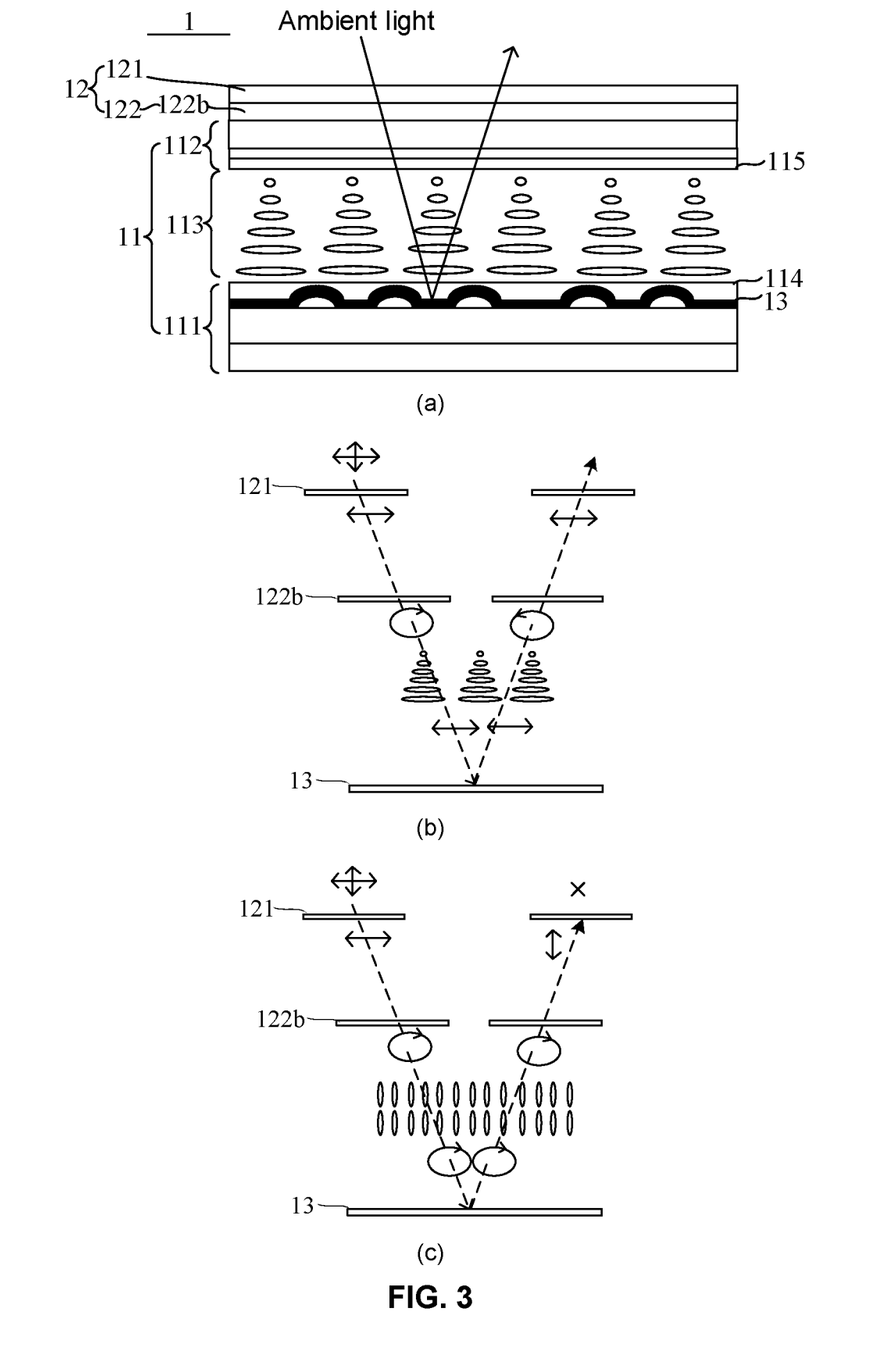
FIG. 3 is a diagram illustrating a sectional structure and a principle of a display implementation manner of a reflective liquid crystal display panel, in accordance with yet some other embodiments.

In some embodiments, as shown in (a) of FIG. 1, (a) of FIG. 2, and (a) of FIG. 3, the reflective liquid crystal display panel 1 includes a liquid crystal cell 11 and a optical film 12, and the optical film 12 includes a polarizer 121 and other structures, such as a phase compensation film 122. The liquid crystal cell 11 includes a display substrate 111 and an opposite substrate 112 disposed opposite to each other, and a liquid crystal layer 113 disposed between the display substrate 111 and the opposite substrate 112. The display substrate 111 may be an array substrate including a thin film transistor (TFT) driving circuit, an insulating layer and a pixel electrode, etc. The opposite substrate 112 may be a color filter substrate provided with a black matrix and a color filter. Liquid crystal molecules in the liquid crystal layer 113 may be nematic liquid crystals, cholesteric liquid crystals or the like. The structures in the optical film 12 such as the polarizer 121 and the phase compensation film 122 are disposed on a side of the opposite substrate 112 away from the display substrate 111.

The reflective liquid crystal display panel 1 is formed by providing a reflective material under a liquid crystal display panel (i.e. the liquid crystal cell 11) to replace a backlight of a transmissive display panel, which utilizes light reflected by a mirror surface as a display light source under a condition of sufficient ambient light. For example, as shown in FIGS. 1, 2 and 3, a reflective layer 13 may be provided on a surface of the display substrate 111 proximate to the opposite substrate 112, and the reflective layer 13 is used to reflect incident light.

Based on this, according to a display principle of the reflective liquid crystal display panel 1 that, the optical film 12 is added with the phase compensation film 122 such as a λ/2 wave plate, a λ/4 wave plate, so as to cooperate with the liquid crystal cell 11 to convert a polarization state of light, and a whole light path is turned-on and turned-off by adjusting a rotation state of liquid crystal molecules in the liquid crystal layer 113, display of the reflective liquid crystal display panel 1 is achieved.

In some embodiments, as shown in FIGS. 1, 2 and 3, the phase compensation film 122 may include at least one of λ/2 plate 122a and λ/4 plate 122b, and the phase compensation film 122 is closer to the opposite substrate 112 than the polarizer 121.

Herein, considering an example in which the liquid crystal in the liquid crystal layer 113 is twisted nematic (TN) liquid crystal, that is, the liquid crystal may form a continuous twisted shape between the display substrate 111 and the opposite substrate 112, and a twist angle of the liquid crystal molecules in the liquid crystal layer 113 is 90 degrees, in a case where the phase compensation film 122 includes a λ/2 plate 122a, a display manner of the reflective liquid crystal display panel 1 is as follows.

When no voltage is applied to the reflective liquid crystal display panel 1, as shown in (b) of FIG. 2, the ambient light is converted into linearly polarized light after passing through the polarizer 121. An included angle between the linearly polarized light and a fast (or slow) axis of the λ/2 plate 122a is a, and the linearly polarized light rotates toward the fast (or slow) axis with an angle of 2a after passing through the λ/2 plate. As a result, a polarization direction of the linearly polarized light changes. The liquid crystal layer 113 with a certain thickness in a state where no voltage is applied may be equivalent to a λ/4 plate, so the linearly polarized light is converted into circularly polarized light (e.g., right-handed) after passing through the liquid crystal molecules. A rotation direction of the circularly polarized light is turned to be left-handed after the circularly polarized light is reflected by the reflective layer 13, and the left-handed circularly polarized light is converted into linearly polarized light after passing through the liquid crystal layer. Then, the linearly polarized light is still linearly polarized light after passing through the λ/2 plate 122a, and the polarization direction thereof is parallel to an absorption axis direction of the polarizer 121, thereby achieving a dark state.

When a voltage is applied to the reflective liquid crystal display panel 1, as shown in (c) of FIG. 2, a long axis of the liquid crystal molecules is perpendicular to the reflective layer 13, and the light does not undergo birefringence when passing through the liquid crystal molecules. As a result, the linearly polarized light is still linearly polarized light after being reflected, but the polarization direction changes. The linearly polarized light changes into a linearly polarized light in which the polarization direction is perpendicular to the absorption axis direction of the polarizer 121 after passing through the λ/2 wave plate 122a, thereby achieving a bright state.

In a case where the phase compensation film 122 includes a λ/4 plate 122a, according to that a linearly polarized light can be converted into a circularly polarized light or an elliptical polarized light, and a circularly polarized light or an elliptical polarized light can be converted into a linearly polarized light by the λ/4 plate, as well as the linearly polarized light is still linearly polarized light after being reflected, but the polarization direction thereof changes, and the circularly polarized light is still circularly polarized light after being reflected, but the rotation direction thereof is opposite, it may be known that the display manner of the reflective liquid crystal display panel 1 is as follows.

When no voltage is applied to the reflective liquid crystal display panel 1, as shown in (b) of FIG. 3, the ambient light is converted into linearly polarized light after passing through the polarizer 121, and the linearly polarized light is converted into circularly polarized light (e.g., right-handed) after passing through the λ/4 plate. The liquid crystal layer with a certain thickness in a state where no voltage is applied may be equivalent to a λ/4 plate, so the circularly polarized light is converted into linearly polarized light after passing through the liquid crystal layer. The linearly polarized light is still linearly polarized light after being reflected, but the polarization direction changes. Then, the linearly polarized light is converted into circularly polarized light (e.g., left-handed) after passing through the liquid crystal layer. The circularly polarized light is converted into linearly polarized light after passing through the λ/4 plate, and the polarization direction thereof is perpendicular to the absorption axis direction of the polarizer 121, thereby achieving a bright state.

When a voltage is applied to the reflective liquid crystal display panel 1, as shown in (c) of FIG. 3, the long axis of the liquid crystal molecules is perpendicular to the reflective layer 13, and the light does not undergo birefringence when passing through the liquid crystal molecules. The rotation direction of the circularly polarized light (e.g., right-handed) is turned to be left-handed, and then, the left-handed circularly polarized light is converted into linearly polarized light after passing through the λ/4 plate 122b. However, the polarization direction of the linearly polarized light coincides with the absorption axis direction of the polarizer 121, so that the light cannot be emitted, and a dark state is achieved.

In a case where the phase compensation film 122 includes a λ/2 plate 122a and a λ/4 plate 122b, the display manner of the reflective liquid crystal display panel 1 is as follows.

When no voltage is applied to the reflective liquid crystal display panel 1, as shown in (b) of FIG. 1, the ambient light is converted into linearly polarized light after passing through the polarizer, and an included angle between the linearly polarized light and a fast (or slow) axis of the λ/2 plate 122a is a. The linearly polarized light rotates toward the fast (or slow) axis with an angle of 2a after passing through the λ/2 plate, and then is converted into circularly polarized light (e.g., right-handed) after passing through the λ/4 plate. The liquid crystal layer with a certain thickness in a state where no voltage is applied may be equivalent to a λ/4 plate, so the circularly polarized light may be converted into linearly polarized light after passing through the liquid crystal layer with a certain thickness. The linearly polarized light is still linearly polarized light after being reflected, but the polarization direction changes. Then, the linearly polarized light may be converted into circularly polarized light (e.g., left-handed) after passing through the liquid crystal layer with a certain thickness, and the circularly polarized light is converted into linearly polarized light after passing through the λ/4 plate 122b and the λ/2 plate 122a in sequence, and the polarization direction thereof is perpendicular to the absorption axis direction of the polarizer 121, thereby achieving a bright state.

When a voltage is applied to the reflective liquid crystal display panel 1, as shown in (c) of FIG. 1, the long axis of the liquid crystal molecules is perpendicular to the reflective layer 13, and the light does not undergo birefringence when passing through the liquid crystal molecules. The rotation direction of the circularly polarized light (e.g., right-handed) is turned to be left-handed, and then, the circularly left-handed polarized light is converted into linearly polarized light after passing through the λ/4 plate 122b and the λ/2 plate 122a. However, the polarization direction of the linearly polarized light coincides with the absorption axis direction of the polarizer 121, so that the light cannot be emitted, and a dark state is achieved.

Herein, it is possible to provide a phase retardation of π/2 in a range of wavelength of visible light by the λ/4 plate 122b, thereby achieving conversion between linearly polarized light and circularly polarized light. Moreover, the conversion efficiency between the linearly polarized light and the circularly polarized light in the entire wavelength of the visible light may be improved by the λ/2 plate 122a and the λ/4 plate 122b, and in turn the reflectivity may be improved and color shift may be reduced.

Moreover, the reflectivity and the dispersion effect of the reflective liquid crystal display panel 1 are also related to relevant optical parameters of the polarizer 121, the phase compensation film 122 and the liquid crystal cell 11 in the reflective liquid crystal display panel 1. That is, in order to improve the reflectivity of the reflective liquid crystal display panel 1, there is a need to optimize an angle of the absorption axis of the polarizer 121, optical characteristics of the phase compensation film 122, a cell thickness of the liquid crystal cell 11, birefringence of the liquid crystal layer 113, the twist angle of the liquid crystal molecules, characteristics of the reflection layer 13 and the like.

Figure 4:
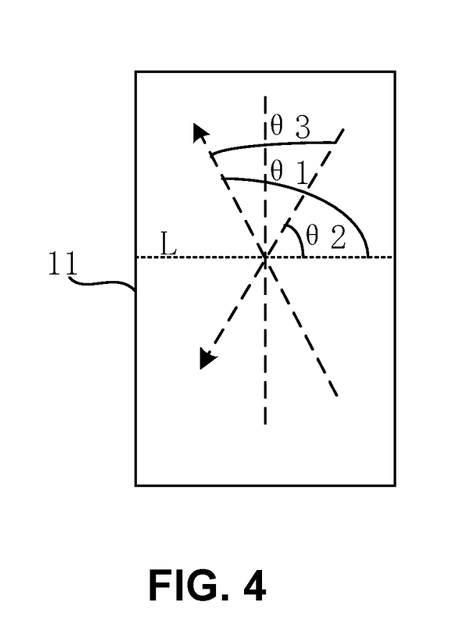
FIG. 4 is a front view illustrating a liquid crystal cell, in accordance with some embodiments.

In some embodiments, as shown in (a) of FIG. 1, (a) of FIG. 2, (a) of. FIG. 3, and FIG. 4, the reflective liquid crystal display panel 1 further includes a first alignment film 114 disposed on the display substrate 111 and a second alignment film 115 disposed on the opposite substrate 112. The first alignment film 114 has a first alignment angle 81 with respect to a reference line L, and the second alignment film 115 has a second alignment angle 82 with respect to the reference line L. The first alignment angle 81 may be 100 degrees to 150 degrees, and the second alignment angle 82 may be 30 degrees to 80 degrees. A retardation amount of the liquid crystal cell 11 composed of the display substrate 111, the opposite substrate 112 and the liquid crystal layer 113 may be 150 nm to 300 nm. The twist angle 83 of the liquid crystal molecules in the liquid crystal layer 113 may be 50 degrees to 90 degrees.

Figure 5:
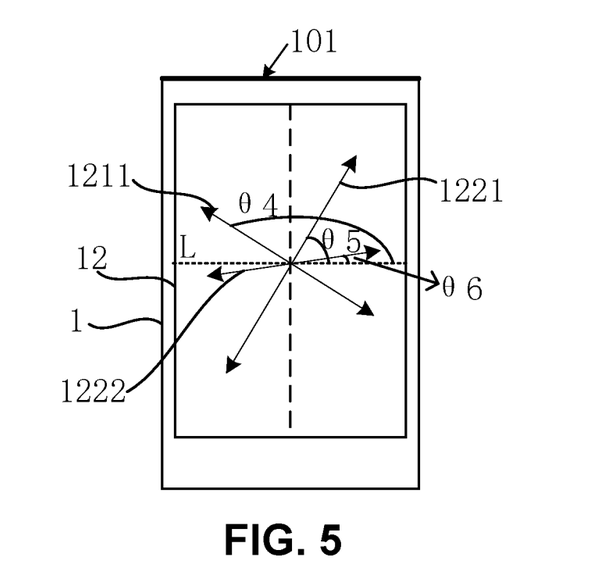
FIG. 5 is a top view illustrating a structure of a reflective liquid crystal display panel, in accordance with some embodiments.

As shown in FIG. 5, the reference line L may be a straight line in a plane where the display substrate 111 or the opposite substrate 112 is located, and the straight line is parallel to a side 101 of the reflective liquid crystal display panel 1 provided with a driver chip. As seen from a front view direction (e.g., in a normal line direction of the display panel), as shown in FIGS. 4 and 5, a direction in which the straight line extends to the right is a 0 degree direction, an angle formed by anticlockwise rotation with respect to the 0 degree direction of each of the first alignment angle 81, the second alignment angle 82, the angle of the absorption axis of the polarizer 121 and the angle of the slow axis of the phase compensation film 122 is positive, and an angle formed by clockwise rotation with respect to the 0 degree direction of each of the first alignment angle 81, the second alignment angle 82, the angle of the absorption axis of the polarizer 121 and the angle of the slow axis of the phase compensation film 122 is negative.

Herein, it will be noted that, the twist angle of the liquid crystal molecules in the liquid crystal layer 113 is 50 degrees to 90 degrees, and the liquid crystal molecules may be TN liquid crystals. In this case, a first electrode and a second electrode may be provided in the display substrate 111 and the opposite substrate 112 respectively, and the liquid crystal molecules may be driven to rotate by applying a voltage to the first electrode and the second electrode.

Furthermore, in some embodiments, as shown in (a) of FIG. 1, (a) of FIG. 2, (a) of FIG. 3, and FIG. 5, in the case where the phase compensation film 122 includes the λ/2 plate 122a and the λ/4 plate 122b, the angle 84 of the absorption axis of the polarizer 121 may be 150 degrees to 180 degrees, the angle 85 of the slow axis of the λ/2 plate 122a may be 40 degrees to 80 degrees, and the angle 86 of the slow axis of the λ/4 plate 122b may be −20 degrees to 20 degrees. In the case where the phase compensation film 122 includes the λ/4 plate 122b, the angle of the absorption axis of the polarizer 121 may be 150 degrees to 180 degrees, and the angle 86 of the slow axis of the λ/4 plate 122b may be 15 degrees to 135 degrees. In the case where the phase compensation film 122 includes the λ/2 plate 122a, the angle 84 of the absorption axis of the polarizer 121 may be −30 degrees to 30 degrees, and the angle 86 of the slow axis of the λ/2 plate 122a may be 45 degrees to 80 degrees.

Herein, as shown in FIG. 5, the angle 84 of the absorption axis of the polarizer 121 refers to an angle formed by the absorption axis 1211 of the polarizer 121 with respect to the reference line L, the angle 85 of the slow axis of the λ/2 plate 122a refers to an angle formed by the slow axis 1221 of the λ/2 plate 122a with respect to the reference line L, and the angle 86 of the slow axis of the λ/4 plate 122b refers to an angle formed by the slow axis 1222 of the λ/4 plate 122b with respect to the reference line L.

On the basis of the above structure, although the dispersion effect may be reduced to a certain extent by adding the λ/2 plate 122a and the λ/4 plate 122b in the optical film 12 and cooperating the polarizer 121 with the liquid crystal cell 11, there is a light leakage more or less when the incident light passes through the polarizer 121, the liquid crystal layer 113 and the light reflective layer 13. In a case where the retardation amount of the liquid crystal cell 11 is large, the conversion efficiency of light with a high wavelength is high, resulting in a white picture yellowish, so that the display effect of paper white for electronic paper products cannot be achieved.

Figure 6:
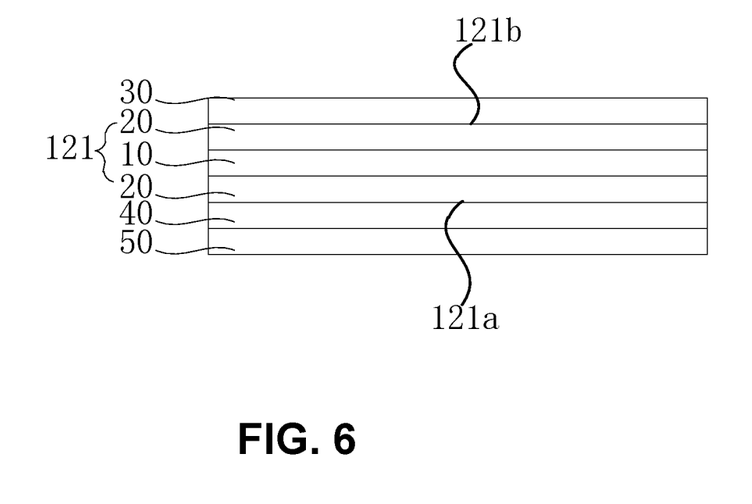
FIG. 6 is a sectional view illustrating a structure of an optical film, in accordance with some embodiments.

Based on this, in some embodiments, as shown in FIG. 6, the polarizer 121 may include a base layer 10 and a triacetylcellulose (TAC) layers 20 disposed on each of two opposite surfaces of the base layer 10. A material of the base layer 10 is obtained by dyeing a base material with a dye. The base material includes a polyvinyl alcohol (PVA) material, and the dye is selected from blue dichroic organic dyes.

Most crystals produce equal intensities of o-ray and e-ray when natural light is incident. However, some crystals have a large difference in absorption of two refracted rays, and this property is called dichroism. In the microscopic field, a light absorption rate of molecules is not a scalar, but is a vector, which has a certain directionality. If absorption coefficients in three directions are different, a difference between two coefficients is called dichroism. Macroscopically, the dichroism of the absorption rate is shown by the directivity of the absorption coefficient. The macroscopic dichroism is not only related to the dichroism of the molecules, but also related to an arrangement of moleculars, so the dichroism may be used as a method of characterizing a degree of orientation. In addition, some functional groups on a macromolecular chain have a certain directionality, which may also show dichroism to blue light with different vibration directions, and this property is called blue dichroism.

The base material is dyed with a blue dichroic organic dye, and the dyed PVA material is stretched in one direction at a certain temperature and humidity, so that the dyed PVA material absorbs the blue dichroic organic dye to have the polarization property.

It was found through experiments that, dyeing the base material with the blue dichroism organic dye can reduce a* and b* of the polarizer 121 in the CIE1976 L*a*b* chromaticity space, and increasing the addition amount of the dye may adjust the a* and b* of the polarizer 121 in CIE1976 L*a*b* to be below a certain level.

The CIE1976 L*a*b* chromaticity space (also known as CIE LAB color space) is a uniform color space recommended by the International Institute of Illumination (CIE) in 1976. The space is a three-dimensional rectangular coordinate system, which is the most widely used color measurement system at present. The lightness L* and the chromaticity coordinates a* and b* are used to represent a position of a color in the color space. L* represents the brightness of the color; a positive value of a* represents reddish, and a negative value of a* represents greenish; a positive value of b* represents yellowish, and a negative value of b* represents bluish.

According to the above, in order to enable the color coordinates ($W_x$, $W_y$) of the white picture displayed by the reflective liquid crystal display panel 1 to reach the level of electronic paper, there is a need to enable the $W_x$ to less than or equal to 0.32, and enable the $W_y$ to less than or equal to 0.34. Under the D65 (Artificial Daylight 6500K) light source, calculation formulas of the CIE1976 L*a*b* color coordinate as following:

$$L^* = 116(Y/Y_0)^{\frac{1}{3}} - 16$$

$$a^* = 500\left[\left(\frac{X}{X_0}\right)^{\frac{1}{3}} - \left(\frac{Y}{Y_0}\right)^{\frac{1}{3}}\right]$$

$$b^* = 200\left[\left(\frac{Y}{Y_0}\right)^{\frac{1}{3}} - \left(\frac{Z}{Z_0}\right)^{\frac{1}{3}}\right]$$

Since the $W_x$ is equal to X/(X+Y+Z), the $W_y$ is equal to Y/(X+Y+Z), and the standard tristimulus values $X_0$, $Y_0$ and $Z_0$ of the D65 light source are equal to 94.81, 100, and 107.32, respectively. After these values are plugged into the calculation formula, an Equation (1) may be obtained as following:

$$a^* = 500\left[\left(\frac{(W_x/W_y) \times Y}{94.81}\right)^{\frac{1}{3}} - \left(\frac{Y}{100}\right)^{\frac{1}{3}}\right] \quad \text{Equation (1)}$$

-continued $$b^* = 200\left[\left(\frac{Y}{100}\right)^{\frac{1}{3}} - \left(\frac{(1-W_x-W_y)/W_y \times Y}{107.32}\right)^{\frac{1}{3}}\right]$$

Therefore, in order to enable the white picture of the reflective liquid crystal display panel (RLCD) to reach a level of the electronic paper, by plugging the $W_x$ less than or equal to 0.320 and $W_y$ less than or equal to 0.340 into Equation (1), it may be obtained that:

$a^*(\text{RLCD}) \leq -0.769$ $b^*(\text{RLCD}) \leq 2.932$

A value of a* of the white picture displayed by the reflective liquid crystal display panel 1 in the CIE1976 L*a*b* chromaticity space is equal to a sum of a value of a* of a combination of the reflective liquid crystal display panel 1 including the phase compensation film 122 and the liquid crystal cell 11 except for the polarizer 121 in the CIE1976 L*a*b* chromaticity space and a value of a* of the polarizer 121 in the CIE1976 L*a*b* chromaticity space. A value of b* of the white picture displayed by the reflective liquid crystal display panel 1 in the CIE1976 L*a*b* chromaticity space is equal to a sum of a value of b* of the combination of the reflective liquid crystal display panel 1 including the phase compensation film 122 and the liquid crystal cell 11 except for the polarizer 121 in the CIE1976 L*a*b* chromaticity space and a value of b* of the polarizer 121 in the CIE1976 L*a*b* chromaticity space. The values of a* and b* of the combination of the reflective liquid crystal display panel 1 including the phase compensation film 122 and the liquid crystal cell 11 except for the polarizer 121 in the CIE1976 L*a*b* chromaticity space may be obtained by simulating the optical parameters of the reflective liquid crystal display panel 1. In this way, according to the optical parameters (e.g., the angle of the absorption axis of the polarizer 121, the angle of the slow axis and a retardation amount of the phase compensation film 122, the retardation amount of the liquid crystal cell 11, and the twist angle of the liquid crystal molecules in the liquid crystal layer) of the reflective liquid crystal display panel 1, the structure of the reflective liquid crystal display panel 1 is simulated to obtain simulation color coordinate values of the white picture displayed by the reflective liquid crystal display panel 1. Moreover, according to a corresponding relationship between the simulation color coordinate values and a* and b*, simulation values of a* and b* of the reflective liquid crystal display panel 1 in the CIE1976 L*a*b* chromaticity space may be calculated, so that the values of the a* and b* of the polarizer 121 in the CIE1976 L*a*b* chromaticity space may be calculated by the following formulas. Herein, a*(RLCD_SIM) represents the simulation value of a* of the reflective liquid crystal display panel 1 in CIE1976 L*a*b* chromaticity space, b*(RLCD_SIM) represents the simulation value of b* of the reflective liquid crystal display panel 1 in the CIE1976 L*a*b* chromaticity space, a*(POL) represents the value of a* of polarizer 121 in the CIE1976 L*a*b* chromaticity space, and b*(POL) represents the value of b* of the polarizer 121 in the CIE1976 L*a*b* chromaticity space.

$a^*(\text{RLCD}) = a^*(\text{RLCD\_SIM}) + a^*(\text{POL})$ $b^*(\text{RLCD}) = b^*(\text{RLCD\_SIM}) + b^*(\text{POL})$ Based on this, in order to avoid a deviation between the simulation value and the actual value, which affects calculation result, the actual value of the reflective liquid crystal display panel 1 after the simulation may also be measured, and the actual value of the reflective liquid crystal display panel 1 after the simulation can be measured. The deviation between the simulation value and the actual value is obtained by averaging results of a plurality of experiments, and the calculation result which accords with the actual value may be obtained by adding the simulation value to the deviation between the simulation value and the actual value. The formula is as following:

$a^*(\text{RLCD}) = a^*(\text{RLCD\_SIM}) + a^*(\text{POL}) + \Delta a'$ $b^*(\text{RLCD}) = b^*(\text{RLCD\_SIM}) + b^*(\text{POL}) + \Delta b'$

Herein, considering an example in which after averaging the results of the plurality of experiments, a deviation $\Delta a'$ between the actual value and the simulation value is approximately equal to −8.117, and a deviation $\Delta b'$ is approximately equal to 2.495, an Equation (2) may be obtained by plugging the deviations $\Delta a'$ and $\Delta b'$ into the above formula as following:

$a^*(\text{POL}) \leq 7.348 - a^*(\text{RLCD\_SIM})$ $b^*(\text{POL}) \leq 0.437 - b^*(\text{RLCD\_SIM})$     Equation (2)

Based on this, the values of a* and b* of the polarizer 121 are adjusted by dyeing the base material with the blue dichroism organic dye, and the values of a* and b* of the polarizer 121 are adjusted to be below a certain level by increasing the addition amount of the dye, so that the problem that the white picture displayed by the reflective liquid crystal display panel 1 is yellowish may be solved.

In some embodiments, the dye may be an azo dye or an anthraquinone dye. In some examples, a structural formula of the azo dye may be as shown in the following formula.

M = H, Na, K

In some embodiments, in order to enable the color coordinates of the white picture displayed by the reflective liquid crystal display panel 1 to reach the level of electronic paper, the a* of the polarizer 121 in the CIE1976 L*a*b* chromaticity space is less than or equal to 2.127, and the b* of the polarizer 121 in the CIE1976 L*a*b* chromaticity space is less than or equal to −0.329.

In order to enable the value of a* of the polarizer 121 in the CIE1976 L*a*b* chromaticity space to be less than or equal to 2.127, and the value of b* to be less than or equal to −0.329, in some embodiments, the mass percentage of the dye in the base material is 0.01% to 2%.

On the basis of the above structure, as shown in FIG. 6, the polarizer 121 includes a first surface 121*a* and a second surface 121*b* opposite to each other in a thickness direction of the polarizer 121. In application, one surface of the polarizer 121 may be attached to the opposite substrate, and the other surface of the polarizer 121 may be provided with a protective film 30 to prevent scratches from being made on the surface of the polarizer 121 contacting the outside during usage. In this case, the polarizer 121 may be a separate product. When the polarizer 121 is not used, the surface of the polarizer 121 to be attached to the opposite substrate may be provided with an adhesive layer 40, and a release film 50 may be attached to the adhesive layer 40. When the polarizer 121 is used, the release film 50 is peeled off, and the polarizer 121 is attached to the opposite substrate through the adhesive layer 40.

In this case, the opposite substrate may be an opposite substrate to which the phase compensation film 122 has been attached.

Figure 7:
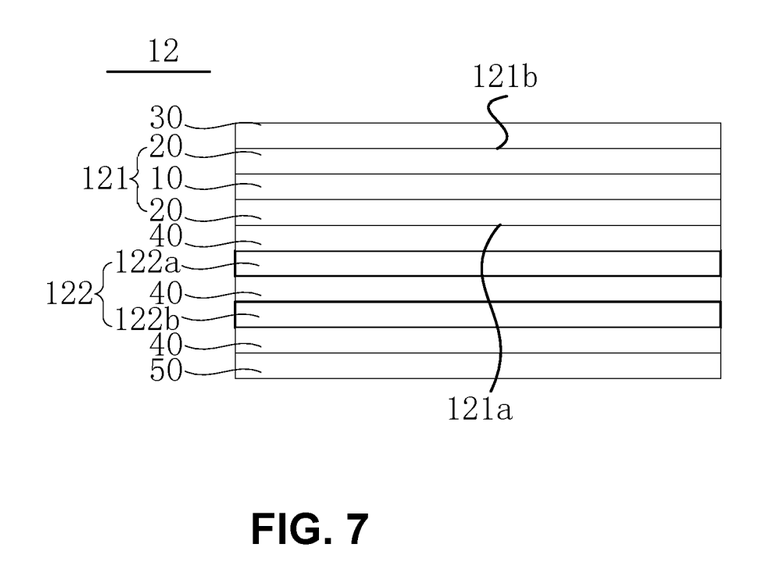
FIG. 7 is a sectional view illustrating a structure of an optical film, in accordance with some other embodiments.
Figure 8:
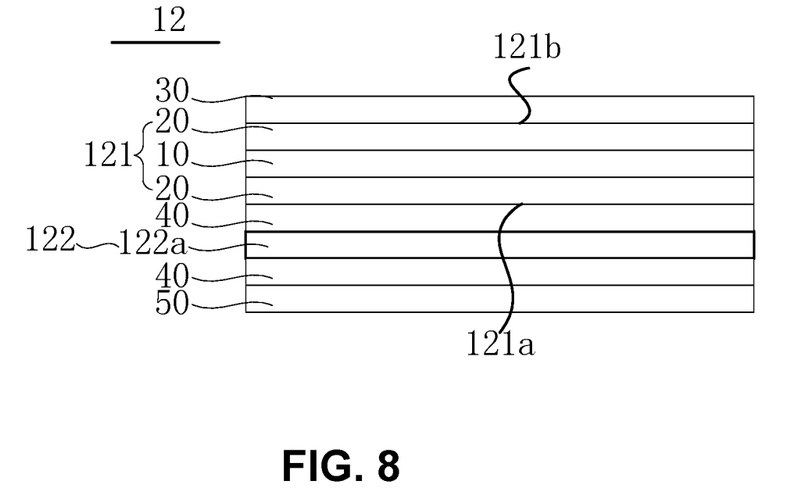
FIG. 8 is a sectional view illustrating a structure of an optical film, in accordance with some other embodiments.
Figure 9:
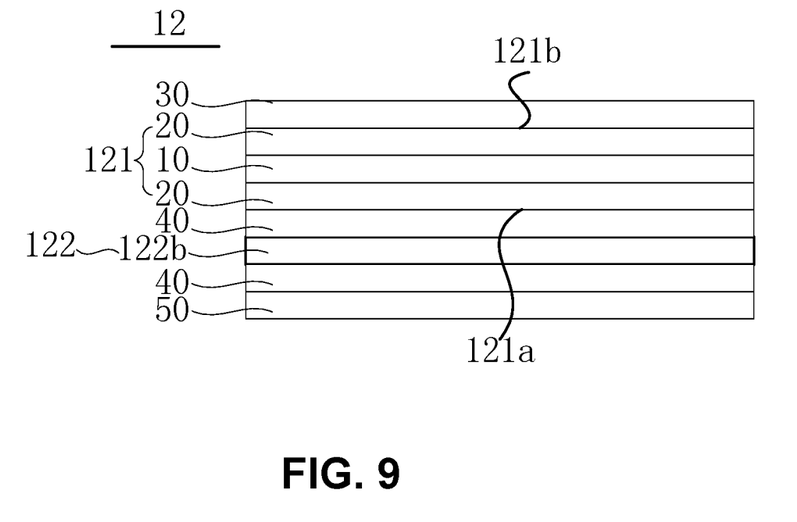
FIG. 9 is a sectional view illustrating a structure of an optical film, in accordance with yet some other embodiments.

In the optical film 12 provided by some embodiments of the present disclosure, as shown in FIGS. 7, 8 and 9, in addition to the polarizer 121 and the phase compensation film 122 described above, the optical film 12 further includes: a protective film 30 disposed on the second surface 121*b* of the polarizer 121, an adhesive layer 40 disposed on a side of the phase compensation film 122 away from the polarizer 121, and a release layer 50 disposed on a surface of the adhesive layer 40 away from the polarizer 121.

That is, in this case, the optical film 12 may be a separate product. When the optical film 12 is not used, as shown in FIGS. 7, 8 and 9, the first surface 121*a* of the polarizer 121 and the phase compensation film 122 may be bonded together by another adhesive layer 40. For example, in a case where the phase compensation film 122 includes the λ/2 plate 122*a* and the λ/4 plate 122*b*, as shown in FIG. 7, the polarizer 121 and the λ/2 wave plate 122*a* are bonded together by the adhesive layer 40, and the λ/2 plate 122*a* and the λ/4 plate 122*b* are bonded together by yet another adhesive layer 40. In a case where the phase compensation film 122 includes the λ/2 plate 122*a*, as shown in FIG. 8, the polarizer 121 and the λ/2 plate 122*a* are bonded together directly by the adhesive layer 40. In a case where the phase compensation film 122 includes the λ/4 plate 122*b*, as shown in FIG. 9, the polarizer 121 and the λ/4 plate 122*b* are bonded to together directly by the adhesive layer 40.

When the optical film 12 is used, the release film 50 is peeled off, and the optical film 12 is attached to the opposite substrate by the adhesive layer 40. In this case, the second surface 121*b* of the polarizer 121 is the surface that contacts the outside. By providing the protective film 30 on the second surface 121*b* of the polarizer 121, the surface of the polarizer 121 that contacts the outside may also be prevented scratches from being made during usage.

On the basis of the above structure, in some embodiments, the a* of the white picture displayed by the reflective liquid crystal display panel 1 in the CIE1976 L*a*b* chromaticity space is less than or equal to −0.769, and the b* of the white picture displayed by the reflective liquid crystal display panel 1 in the CIE1976 L*a*b* chromaticity space is less than or equal to 2.932. That is, after adjusting the a* and b* of the polarizer 121 in the CIE1976 L*a*b* chromaticity space, the color coordinates of the white picture displayed by the reflective liquid crystal display panel 1 may be reached the level of the electronic paper.

Figure 10:
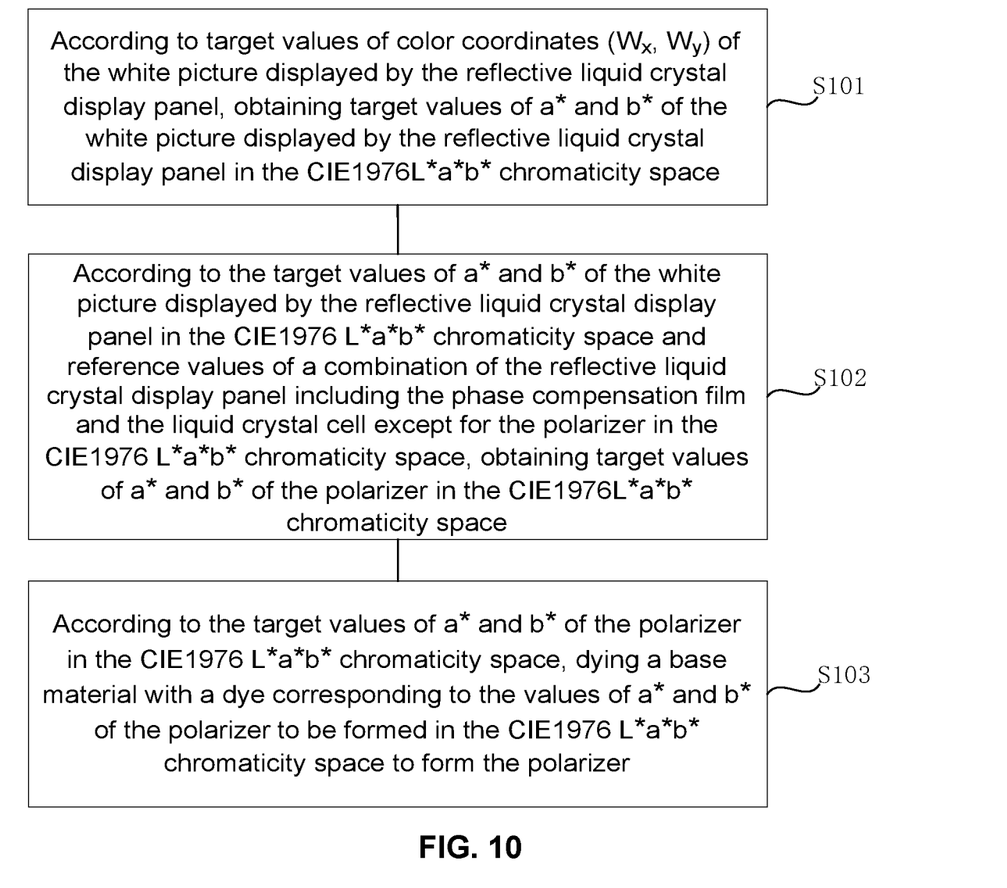
FIG. 10 is a flow chart of a method of manufacturing an optical film, in accordance with some embodiments.

Some embodiments of the present disclosure provide a method of manufacturing an optical film 12. The optical film 12 is applied to a reflective liquid crystal display panel 1, and includes a phase compensation film 122 and a polarizer 121. The reflective liquid crystal display panel 1 includes a liquid crystal cell 11. As shown in FIG. 10, the method includes following steps.

In step 101 (S101), according to target values of color coordinates ($W_x$, $W_y$) of a white picture displayed by the reflective liquid crystal display panel 1, target values of a* and b* of the white picture displayed by the reflective liquid crystal display panel 1 in the CIE1976 L*a*b* chromaticity space are obtained.

Herein, considering an example in which the target values of the color coordinates ($W_x$, $W_y$) of the white picture displayed by the reflective liquid crystal display panel 1 reaches a level of an electronic paper, $W_x$ is less than or equal to 0.32, and $W_y$ is less than or equal to 0.34.

In this case, a corresponding relationship between the color coordinates ($W_x$, $W_y$) of the white picture displayed by the reflective liquid crystal display panel 1 and a* and b* of the white picture displayed by the reflective liquid crystal display panel 1 in the CIE1976 L*a*b* chromaticity space is shown in the following Equation (1).

$$a^* = 500\left[\left(\frac{(W_x/W_y)\times Y}{94.81}\right)^{\frac{1}{3}} - \left(\frac{Y}{100}\right)^{\frac{1}{3}}\right]$$

$$b^* = 200\left[\left(\frac{Y}{100}\right)^{\frac{1}{3}} - \left(\frac{(1-W_x-W_y)/W_y \times Y}{107.32}\right)^{\frac{1}{3}}\right]$$

By plugging the $W_x$ less than or equal to 0.32 and the $W_y$ less than or equal to 0.34 into Equation (1), the target values of a* and b* of the white picture displayed by the reflective liquid crystal display panel 1 may be obtained to meet following conditions.

$a^*(\text{RLCD}) \leq -0.769$ $b^*(\text{RLCD}) \leq 2.932$

In S102, according to the target values of a* and b* of the white picture displayed by the reflective liquid crystal display panel 1 in the CIE1976 L*a*b* chromaticity space and reference values of a combination of the reflective liquid crystal display panel including the phase compensation film 122 and the liquid crystal cell 11 except for the polarizer in the CIE1976 L*a*b* chromaticity space, target values of a* and b* of the polarizer 121 in the CIE1976 L*a*b* chromaticity space are obtained.

The target values of a* and b* of the white picture displayed by the reflective liquid crystal display panel 1 in the CIE1976 L*a*b* chromaticity space are related to the optical parameters of components of the reflective liquid crystal display panel 1, therefore, it may be known that, in a case where a structure and material of each component of the reflective liquid crystal display panel 1 are all determined, the value of the a* of the white picture displayed by the reflective liquid crystal display panel 1 in the CIE1976 L*a*b* chromaticity space is equal to a sum of values of a* of the components of the reflective liquid crystal display panel 1 in the CIE1976 L*a*b* chromaticity space, and the value of the b* of the white picture displayed by the reflective liquid crystal display panel 1 in the CIE1976

L*a*b* chromaticity space is equal to a sum of values of b* of the components of the reflective liquid crystal display panel 1 in the CIE1976 L*a*b* chromaticity space. Moreover, the reflective liquid crystal display panel 1 may be decomposed into components such as the polarizer 121, the phase compensation film 122 and the liquid crystal cell 11, therefore, it may be seen that, the value of the a* of the white picture displayed by the reflective liquid crystal display panel 1 in the CIE1976 L*a*b* chromaticity space is equal to a sum of a value of a* of the polarizer 121 in the CIE1976 L*a*b* chromaticity space and a value of a* of the combination of the reflective liquid crystal display panel including the phase compensation film 122 and the liquid crystal cell 11 except for the polarizer in the CIE1976 L*a*b* chromaticity space, and the value of the b* of the white picture displayed by the reflective liquid crystal display panel 1 in the CIE1976 L*a*b* chromaticity space is equal to a sum of a value of b* of the polarizer 121 in the CIE1976 L*a*b* chromaticity space and a value of b* of the combination of the reflective liquid crystal display panel including the phase compensation film 122 and the liquid crystal cell 11 except for the polarizer in the CIE1976 L*a*b* chromaticity space.

Furthermore, in some embodiments, before obtaining the values of a* and b* of the polarizer 121 in the CIE1976 L*a*b* chromaticity space according to the target values of a* and b* of the white picture displayed by the reflective liquid crystal display panel 1 in the CIE1976 L*a*b* chromaticity space and the reference values of the combination of the reflective liquid crystal display panel including the phase compensation film 122 and the liquid crystal cell 11 except for the polarizer in the CIE1976 L*a*b* chromaticity space, the method further includes the following step.

According to the optical parameters of the reflective liquid crystal display panel 1, the reference values of the combination of the reflective liquid crystal display panel including the phase compensation film 122 and the liquid crystal cell 11 except for the polarizer in the CIE1976 L*a*b* chromaticity space is obtained. Herein, the optical parameters of the reflective liquid crystal display panel 1 includes: an angle of an absorption axis of the polarizer 121, an angle of a slow axis and a retardation amount of the phase compensation film 122, a retardation amount of the liquid crystal cell 11 and a twist angle of the liquid crystal molecules in the liquid crystal layer 113.

According to the optical parameters of the reflective liquid liquid crystal display panel 1, the color coordinates $(W_x, W_y)$ of the white picture displayed by the reflective liquid crystal display panel 1 may be simulated, and according to the corresponding relationship between the color coordinates $(W_x, W_y)$ of the white picture and a* and b* of the white picture, the values of the combination of the reflective liquid crystal display panel including the phase compensation film 122 and the liquid crystal cell 11 except for the polarizer in the CIE1976 L*a*b* chromaticity space may be obtained.

In some embodiments, according to the optical parameters of the reflective liquid crystal display panel 1, obtaining the reference values of the combination of the reflective liquid crystal display panel 1 including the phase compensation film 122 and the liquid crystal cell 11 except for the polarizer 121 in the CIE1976 L*a*b* chromaticity space may include:

according to the optical parameters of the reflective liquid crystal display panel 1, obtaining simulation color coordinate values of the white picture displayed by the reflective liquid crystal display panel 1 through software simulation; and according to the simulation color coordinate values of the white picture displayed by the reflective liquid crystal display panel 1 and the corresponding relationship between the color coordinates and a* and b* of the white picture, calculating simulation values of a* and b* of the reflective liquid crystal display panel 1 in the CIE1976 L*a*b* chromaticity space. The simulation values of a* and b* of the reflective liquid crystal display panel 1 in the CIE1976 L*a*b* chromaticity space are the reference values.

In some other embodiments, according to the optical parameters of the reflective liquid crystal display panel 1, obtaining the reference values of the combination of the reflective liquid crystal display panel including the phase compensation film 122 and the liquid crystal cell 11 except for the polarizer in the CIE1976 L*a*b* chromaticity space may include:

according to the optical parameters of the reflective liquid crystal display panel 1, obtaining simulation color coordinate values of the white picture displayed by the reflective liquid crystal display panel 1 through software simulation;

according to the simulation color coordinate values of the white picture displayed by the reflective liquid crystal display panel 1 and the corresponding relationship between the color coordinates and a* and b* of the white picture, calculating simulation values of a* and b* of the reflective liquid crystal display panel 1 in the CIE1976 L*a*b* chromaticity space; and according to a deviation between the simulation values of a* and b* of the reflective liquid crystal display panel 1 in the CIE1976 L*a*b* chromaticity space and actual values of a* and b* of the reflective liquid crystal display panel 1 in the CIE1976 L*a*b* chromaticity space, obtaining the actual values of a* and b* of the reflective liquid crystal display panel 1 in the CIE1976 L*a*b* chromaticity space. The actual values of a* and b* of the reflective liquid crystal display panel 1 in the CIE1976 L*a*b* chromaticity space are the reference values.

The deviation between the simulation values of a* and b* of the reflective liquid crystal display panel 1 in the CIE1976 L*a*b* chromaticity space obtained by the above calculation and the actual values of a* and b* of the reflective liquid crystal display panel 1 in the CIE1976 L*a*b* chromaticity space may be obtained by averaging the results of a plurality of experiments.

In S103, according to the target values of a* and b* of the polarizer 121 in the CIE1976 L*a*b* chromaticity space, a base material is dyed with a dye corresponding to the values of a* and b* of the polarizer 121 to be formed in the CIE1976 L*a*b* chromaticity space to form the polarizer.

Herein, considering an example in which the base material (e.g., PVA) of the polarizer 121 is dyed with a blue dichroic organic dye, the dye may be an azo dye or an anthraquinone dye. Herein, values of a* and b* of the polarizer 121 in the CIE1976 L*a*b* chromaticity space may be adjusted to the target values by adjusting the addition amount of dye in the base material.

According to that the target value $W_x$ is less than or equal to 0.32 and the target value $W_y$ is less than or equal to 0.34 in the color coordinates $(W_x, W_y)$ of the white picture displayed by the reflective liquid crystal display panel 1, it may be known that, the mass percentage of the dye in the base material is 0.01% to 2%.

Of course, the above description is given by considering an example in which the base material of the polarizer 121 is dyed directly with a blue dichroic organic dye, and it will be understood by those skilled in the art that, the base material to which iodine molecules are adsorbed or the base material to which iodine molecules are to be attached may also be dyed with a blue dye to adjust a* and b* of the polarizer 121 in the CIE1976 L*a*b* chromaticity space.

In order to objectively evaluate the technical effects of the technical solutions provided by the embodiments of the present disclosure, the technical solutions of the embodiments of the present disclosure will be exemplarily described below by setting a Comparative Example and an Experimental Example.

Experimental Example

A structure of a reflective liquid crystal display panel 1 in Experimental Example may be referred to as shown in (a) in FIG. 1, the reflective liquid crystal display panel 1 includes a liquid crystal cell 11, a λ/4 plate 122b, a λ/2 plate 122a and a polarizer 121 from the bottom to up. As shown in FIGS. 4 and 5, an angle 84 of an absorption axis of the polarizer 121 is 170 degrees; a retardation amount of the λ/2 plate 122a to light with 550 nm wavelength is 270 nm, and an angle 85 of a slow axis of the λ/2 plate 122a is 62.5 degrees; a retardation amount of the λ/4 plate to the light with 550 nm wavelength is 160 nm, and an angle 86 of a slow axis of the λ/4 plate is 0 degree; a first alignment angle 81 in the liquid crystal cell 11 is 55 degrees, a second alignment angle 82 in the liquid crystal cell 11 is 125 degrees, and a retardation amount of the liquid crystal cell 11 is 260 nm. According to the above parameters and simulation by Techwiz 1D software, it may be obtained without considering the color coordinates of the polarizer 121 that, the color coordinate $W_x$ of a white picture displayed by the reflective liquid crystal display panel 1 is 0.32567, the color coordinate $W_y$ of the white picture displayed by the reflective liquid crystal display panel 1 is 0.32813, and the stimulus value Y of the white picture displayed by the reflective liquid crystal display panel 1 is 30.97271. Without regard to the values of a* and b* of the polarizer 121 in the CIE1976 L*a*b* chromaticity space, simulation values of a* and b* of the white picture displayed by the reflective liquid crystal display panel 1 in the CIE1976 L*a*b* chromaticity coordinates may be calculated according to Equation (1), that is, a*(RLCD_SIM) is 5.201, and b*(RLCD_SIM) is 0.766. Moreover, in order to enable the color coordinates of the white picture of the reflective liquid crystal display panel 1 to reach the level of the electronic paper, required target values of a* and b* of the polarizer in the CIE1976 L*a*b* chromaticity space may be calculated according to Equation (2), that is, a*(POL) is less than or equal to 2.127, and b*(POL) is less than or equal to −0.329.

Then, the base material (e.g., PVA) is dyed by using azo dyes with sulfonic acid groups, and the addition amount of dye is adjusted, and then, the dyed base material is stretched under conditions of a certain temperature and humidity to manufacture the base layer 10, and the polarizer 121 is obtained by forming a protective layer (e.g., TAC) on the base layer 10. The values of a* and b* of the polarizer 121 in the CIE1976 L*a*b* chromaticity space may be obtained, that is, a*(POL) is −0.19, and b*(POL) thereof is −2.66.

Comparative Example

For values of a* and b* of a polarizer 121 of a reflective liquid crystal display panel 1 provided by Comparative Example in the CIE1976 L*a*b* chromaticity space, a* (POL) is −1.15, and b*(POL) is 2.47. Other conditions in Comparative Example are exactly the same as in Experimental Example.

By comparing the white picture of Comparative Example and Experimental Example with the white picture of electronic paper through visual inspection and actual measurement, the white picture of Experimental Example may reach the level of electronic paper in the visual inspection results, and the white picture of Comparative Example 1 has a yellowing problem. Results of actual measurement are shown in Table 1 below.

TABLE 1

| Item | Electronic paper | Experimental Example | Comparative Example |
|---|---|---|---|
| $W_x$ (under the D65 light source) | 0.318 | 0.316 | 0.338 |
| $W_y$ (under the D65 light source) | 0.338 | 0.338 | 0.362 |
| Color temperature | 6175 | 6276 | 5285 |

It may be seen from Table 1 that, by testing the color coordinates ($W_x$, $W_y$) and the color temperatures of the white picture of the electronic paper, the reflective liquid crystal display panel provided by Experimental Example, and the reflective display panel provided by Comparative Example under a D65 light source, the color coordinates ($W_x$, $W_y$) of the white picture may be adjusted to the level of the electronic paper and the white picture has a high color temperature after adjusting a* and b* in the CIE1976 L*a*b* chromaticity coordinates of the polarizer 121 of the reflective liquid crystal display panel 1 provided by Experimental Example, while the color coordinates ($W_x$, $W_y$) of the white picture of the reflective liquid crystal display panel 1 provided by Comparative Example are both more than the color coordinates of the white picture of the electronic paper, and the white picture of the reflective liquid crystal display panel 1 provided by Comparative Example has a low color temperature.

In summary, in the embodiments provided by the present disclosure, a* and b* of the polarizer 121 in the CIE1976 L*a*b* chromaticity space are adjusted by dyeing the base material of the polarizer 121, so that the color coordinates of the white picture displayed by the reflective liquid crystal display panel 1 are adjusted to the level of the electronic paper, so as to solve the problem of the yellowish white picture of the reflective liquid crystal display panel 1.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An optical film, the optical film being applied to a reflective liquid crystal display panel including a liquid crystal cell, and the optical film comprising:
   a phase compensation film; and
   a polarizer, the polarizer including a base layer, a material of the base layer being obtained by dyeing a base material with a dye; a color of the dye corresponding to values of a* and b* of the polarizer in a CIE1976 L*a*b* chromaticity space, and the values of a* and b* of the polarizer in the CIE1976 L*a*b* chromaticity space being obtained according to target values of a* and b* of a white picture displayed by the reflective liquid crystal display panel in the CIE1976 L*a*b* chromaticity space and reference values of a combination of the reflective liquid crystal display panel including the phase compensation film and the liquid crystal cell except for the polarizer in the CIE1976 L*a*b* chromaticity space;

wherein the base material includes a polyvinyl alcohol material, and the dye is selected from blue dichroic organic dyes.

2. The optical film according to claim 1, wherein the dye is an azo dye or an anthraquinone dye.

3. The optical film according to claim 1, wherein a mass percentage of the dye in the base material is 0.01% to 2%.

4. The optical film according to claim 1, wherein a value of a* of the polarizer in the CIE1976 L*a*b* chromaticity space is −0.19, and a value of b* of the polarizer in the CIE1976 L*a*b* chromaticity space is −2.66.

5. The optical film according to claim 1, wherein the polarizer includes a first surface and a second surface opposite to each other in a thickness direction of the polarizer; and the phase compensation film is disposed on the first surface, and the phase compensation film includes at least one of a half wave (λ2) plate or a quarter wave (λ4) plate.

6. The optical film according to claim 5, further comprising a protective film disposed on the second surface.

7. The optical film according to claim 5, further comprising an adhesive layer disposed on a side of the phase compensation film away from the polarizer.

8. The optical film according to claim 7, further comprising a release film disposed on a side of the adhesive layer away from the polarizer.

9. A reflective liquid crystal display panel, comprising: the liquid crystal cell; and
the optical film according to claim 1.

10. The reflective liquid crystal display panel according to claim 9, wherein the liquid crystal cell includes a display substrate and an opposite substrate disposed opposite to each other;

the optical film is disposed on a side of the opposite substrate away from the display substrate; and the phase compensation film of the optical film is closer to the opposite substrate than the polarizer.

11. The reflective liquid crystal display panel according to claim 9, wherein
a* of a white picture displayed by the reflective liquid crystal display panel in the CIE1976 L*a*b* chromaticity space is less than or equal to −0.769, b* of the white picture displayed by the reflective liquid crystal display panel in the CIE1976 L*a*b* chromaticity space is less than or equal to 2.932.

12. The reflective liquid crystal display panel according to claim 10, wherein the liquid crystal cell further includes a first alignment film disposed on the display substrate and a second alignment film disposed on the opposite substrate, and a liquid crystal layer disposed between the display substrate and the opposite substrate;

the first alignment film has a first alignment angle with respect to a reference line, and the second alignment film has a second alignment angle with respect to the reference line;
the first alignment angle is 100 degrees to 150 degrees;
the second alignment angle is 30 degrees to 80 degrees;
a retardation amount of the liquid crystal cell is 150 nm to 300 nm.

13. The reflective liquid crystal display panel according to claim 12, wherein a twist angle of liquid crystal modules in the liquid crystal layer is 50 degrees to 90 degrees.

14. A display apparatus, comprising the liquid crystal display panel according to claim 9.

15. A method of manufacturing an optical film, wherein the optical film is applied to a reflective liquid crystal display panel including a liquid crystal cell and includes a phase compensation film and a polarizer; the method comprises:

obtaining values of a* and b* of the polarizer in a CIE1976 L*a*b* chromaticity space, according to target values of a* and b* of a white picture displayed by the reflective liquid crystal display panel in the CIE1976 L*a*b* chromaticity space and reference values of a combination of the reflective liquid crystal display panel including the phase compensation film and the liquid crystal cell except for the polarizer in the CIE1976 L*a*b* chromaticity space; and dyeing a base material with a dye corresponding to the values of a* and b* of the polarizer to be formed in the CIE1976 L*a*b* chromaticity space to form the polarizer.

16. The method according to claim 15, wherein before obtaining the values of a* and b* of the polarizer in the CIE1976 L*a*b* chromaticity space, according to the target values of a* and b* of the white picture displayed by the reflective liquid crystal display panel in the CIE1976 L*a*b* chromaticity space and the reference values of the combination in the CIE1976 L*a*b* chromaticity space, the method further comprises:

obtaining the reference values of a* and b* of the combination in the CIE1976 L*a*b* chromaticity space, according to optical parameters of the reflective liquid crystal display panel; wherein the optical parameters of the reflective liquid crystal display panel include: an angle of an absorption axis of the polarizer, an angle of a slow axis and a retardation amount of the phase compensation film, a retardation amount of the liquid crystal cell and a twist angle of liquid crystal molecules in the liquid crystal layer.

17. The method according to claim 16, wherein, obtaining the reference values of a* and b* of the combination in the CIE1976 L*a*b* chromaticity space, according to optical parameters of the reflective liquid crystal display panel, includes:

obtaining simulation color coordinate values of the white picture displayed by the reflective liquid crystal display panel through simulation calculation, according to the optical parameters of the reflective liquid crystal display panel; and calculating simulation values of a* and b* of the reflective liquid crystal display panel in the CIE1976 L*a*b* chromaticity space, according to the simulation color coordinate values and a corresponding relationship between color coordinates of the white picture displayed by the reflective liquid crystal display panel in the CIE1976 L*a*b* chromaticity space and a* and b* of the white picture displayed by the reflective liquid crystal display panel in the CIE1976 L*a*b* chromaticity space;

the simulation values of a* and b* of the reflective liquid crystal display panel in the CIE1976 L*a*b* chromaticity space being the reference values; or obtaining actual values of the reflective liquid crystal display panel in the CIE1976 L*a*b* chromaticity space, according to a deviation between the obtained simulation values of a* and b* of the reflective liquid crystal display panel in the CIE1976 L*a*b* chromaticity space by calculation and the actual values of the reflective liquid crystal display panel in the CIE1976 L*a*b* chromaticity space; the actual values of a* and b* of the reflective liquid crystal display panel in the CIE1976 L*a*b* chromaticity space being the reference values.

18. The method according to claim 15, wherein before obtaining the values of a* and b* of the polarizer in the CIE1976 L*a*b* chromaticity space, according to the target values of a* and b* of the white picture displayed by the reflective liquid crystal display panel in the CIE1976 L*a*b* chromaticity space and the reference values of the combination in the CIE1976 L*a*b* chromaticity space, the method further comprises:
   obtaining target values of a* and b* of the white picture displayed by the reflective liquid crystal display panel in the CIE1976 L*a*b* chromaticity space, according to target values of color coordinates of the white picture displayed by the reflective liquid crystal display panel.

19. The method according to claim 15, wherein
the dye is an azo dye or an anthraquinone dye; and
a mass percentage of the dye in the base material is 0.01% to 2%.

20. The optical film according to claim 5, wherein
the phase compensation film includes the $\lambda/2$ plate and the $\lambda/4$ plate, an angle of an absorption axis of the polarizer is 150 degrees to 180 degrees, an angle of a slow axis of the $\lambda/2$ plate is 40 degrees to 80 degrees, and an angle of a slow axis of the $\lambda/4$ plate is −20 degrees to 20 degrees; the $\lambda/4$ plate is closer to the polarizer than the $\lambda/2$ plate; or
the phase compensation film includes the $\lambda/2$ plate, an angle of an absorption axis of the polarizer is −30 degrees to 30 degrees, and an angle of a slow axis of the $\lambda/2$ plate is 45 degrees to 80 degrees; or
the phase compensation film includes the $\lambda/4$ plate, an angle of a absorption axis of the polarizer is 150 degrees to 180 degrees, and an angle of a slow axis of the $\lambda/4$ plate is 15 degrees to 135 degrees.

* * * * *